United States Patent [19]

Drent

[11] Patent Number: 5,061,782

[45] Date of Patent: Oct. 29, 1991

[54] UNSATURATED POLYMERIZATION OF CO AND BICYCLIC CARBOXYLIC ACID COMPOUND BIDENTATE LIGAND OF NITROGEN

[75] Inventor: Eit Drent, Amsterdam, Netherlands

[73] Assignee: Shell Oil Company, Houston, Tex.

[21] Appl. No.: 540,556

[22] Filed: Jun. 20, 1990

Related U.S. Application Data

[62] Division of Ser. No. 379,839, Jul. 14, 1989, Pat. No. 4,960,857.

[30] Foreign Application Priority Data

Jul. 15, 1988 [NL] Netherlands ............... 8801804

[51] Int. Cl.$^5$ ............................................. C08G 67/02
[52] U.S. Cl. ................................. 528/271; 528/392; 528/405
[58] Field of Search .................. 528/271, 392, 405

[56] References Cited

U.S. PATENT DOCUMENTS 4,788,279 11/1988 Drent .................. 528/392
4,960,857 10/1990 Drent .................. 528/392

FOREIGN PATENT DOCUMENTS 229408 7/1987 European Pat. Off. .
251373 1/1988 European Pat. Off. .

Primary Examiner—Harold D. Anderson

[57] ABSTRACT

Linear alternating copolymers of carbon monoxide and an unsaturated bicyclic carboxylic acid compound are produced in the presence of a catalyst composition formed from a palladium compound, an anion of certain strong acids and a bidentate ligand of nitrogen. When the bidentate ligand is a bidentate ligand of phosphorus and an ethylenically unsaturated hydrocarbon is also present, a mixture of polymers is produced which includes the linear alternating copolymer.

18 Claims, No Drawings

UNSATURATED POLYMERIZATION OF CO AND BICYCLIC CARBOXYLIC ACID COMPOUND BIDENTATE LIGAND OF NITROGEN

This is a division of application Ser. No. 379,839 filed July 14, 1989, now U.S. Pat. No. 4,960,857.

FIELD OF THE INVENTION

This invention relates to linear alternating copolymers of carbon monoxide and a bicyclic carboxylic acid compound. More particularly, the invention relates to such polymers of an unsaturated carbon bicyclic carboxylic acid compound, optionally mixed with other linear alternating polymeric material.

BACKGROUND OF THE INVENTION

The class of polymers of carbon monoxide and olefin(s) has been known for some time. Brubaker, U.S. Pat. No. 2,495,286, produced such polymers of relatively low carbon monoxide content in the presence of free radical initiators, e.g., peroxy compounds. U.K. 1,081,304 produced similar polymers of higher carbon monoxide content in the presence of alkylphosphine complexes of palladium as catalyst. Nozaki extended the reaction to produce linear alternating polymers in the presence of arylphosphine complexes of palladium moieties and certain inert solvents. See, for example, U.S. Pat. No. 3,694,412.

More recently, the class of linear alternating polymers of carbon monoxide and at least one ethylenically unsaturated hydrocarbon has become of greater interest in part because of the greater availability of the polymers. More recent processes for the production of such polymers, now becoming known as polyketones or polyketone polymers, are illustrated by a number of published European Patent Applications including 121,965, 181,014, 213,671, and 257,633. The process, now broadly conventional, generally involves the use of a catalyst formed from a compound of a Group VIII metal selected from palladium, cobalt or nickel, the anion of a non-hydrohalogenic acid having a pKa below about 6, preferably below 2, and a bidentate ligand of phosphorous, arsenic, antimony or nitrogen.

The polyketone polymers have been shown to be of the repeating formula —CO—(—A—)— wherein A is a moiety of ethylenically unsaturated hydrocarbon polymerized through the ethylenic unsaturation. By way of specific illustration, when the ethylenically unsaturated hydrocarbon is ethylene, the polymer will be represented by the repeating formula —CO—(—$C_2H_4$—)—. The polyketone polymers are relatively high molecular materials having established utility in the production by known methods of shaped articles having a variety of utilities. Although the polyketone polymers have a number of desirable properties, it is, on occasion, useful to provide for the modification of polyketone properties as by the production of functionalized polymers, i.e., polymers derived from polyketones which contain a plurality of functional groups. One method of polymer functionalization of the polyketone polymer is to chemically modify the polyketone polymer, particularly at the carbonyl groups. For example, the polyketone polymer is catalytically hydrogenated to produce the corresponding polyol or the polymer is reacted with ammonia and hydrogen to produce a polyamine. An alternative method of providing a functionalized polymer is to provide, in place of at least some of the ethylenically unsaturated hydrocarbon, an olefinic compound containing at least one functional group. For example, copending U.S. patent application Ser. No. 267,142, filed Nov. 4, 1988, discloses the production of a linear alternating terpolymer of carbon monoxide, ethylene and maleic anhydride. It would be of advantage, however, to provide for additional polyketone polymers wherein the monomeric units contain functional groups.

SUMMARY OF THE INVENTION

The present invention provides certain novel linear alternating copolymers and a method of producing such polymers. More particularly, the present invention provides linear alternating polymers of carbon monoxide and certain bicyclic carboxylic acid compounds, a process for the production of such polymers and, in a particular case, mixtures of such linear alternating polymers with other polymeric material.

DESCRIPTION OF THE INVENTION

The novel polymers of the invention are produced by contacting the unsaturated bicyclic carboxylic acid compound and carbon monoxide in the presence of one of two types of catalyst compositions. In the presence of a catalyst composition formed from, inter alia, a bidentate ligand of nitrogen, the linear alternating polymer is produced as the substantially sole polymeric product. In an alternate embodiment of the invention, the catalyst composition is formed from, inter alia, a bidentate ligand of phosphorus. In this latter embodiment the presence of an ethylenically unsaturated hydrocarbon is also required and the resulting polymeric product is a mixture of (a) a linear alternating polymer of carbon monoxide and the bicyclic carboxylic compound, (b) a linear alternating polymer of carbon monoxide and the ethylenically unsaturated hydrocarbon and (c) a block copolymer wherein one segment is a linear alternating polymer of carbon monoxide and the bicyclic carboxylic acid compound and another segment is a linear alternating polymer of carbon monoxide and the ethylenically unsaturated hydrocarbon.

The catalyst composition employed in the process of the invention is formed from a compound of palladium, the anion of a non-hydrohalogenic acid having a pH below about 4, preferably below 2, and a bidentate ligand of nitrogen or phosphorus. Although a variety of palladium compounds are useful in the process of the invention the preferred palladium compounds are palladium alkanoates and palladium alkanoates such as palladium acetate, palladium propionate, palladium butyrate and palladium octanoate are satisfactory. Particularly preferred as the palladium alkanoate is palladium acetate. The anion component of the catalyst composition mixture is preferably the anion of a non-hydrohalogenic acid having a pKa (as measured in water at 18° C.) below 2. Suitable anions include anions of inorganic acids such as sulfuric acid and perchloric acid as well as anions of organic acids including carboxylic acids, e.g., trichloroacetic acid, difluoroacetic acid and trifluoroacetic acid, and sulfonic acids, e.g., methanesulfonic acid, trifluoromethanesulfonic acid and p-toluenesulfonic acid. The preferred anions are anions of trifluoroacetic acid or p-toluenesulfonic acid. The anion is preferably provided as the free acid but in an alternate modification the anion is provided as a metal salt, particularly a non-noble transition metal salt such as a copper salt. In yet another embodiment, the palladium and the anion components of the catalyst composition mixture are provided as a single compound such as palladium p-toluenesulfonate. The anion is provided in a quantity of from about 1 equivalent to about 1000 equivalents per mol of palladium (as the metal). Preferred quantities of anion, however, are from about 2 equivalents to about 100 equivalents per mol of palladium.

In the modification of the process of the invention where the bidentate ligand is a bidentate ligand of nitrogen, the ligand is preferably a ligand represented by the formula

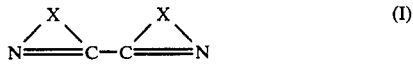 (I)

wherein X independently is a bridging group having from 2 to 4 atoms in the bridge, at least two of which are carbon atoms. Illustrative of these bidentate ligands are bipyridines such as 2,2'-bipyridine, and 4,4'-dimethyl-2,2'-bipyridine and 4,4'-dimethyl-2,2'-bipyridine, 1,10-phenanthrolines such as 1,10-phenanthroline and 1,10-phenanthroline-5-sulfonic acid, 2,2'-biquinoline and 2-(2-pyridyl)benzimidazole.

In the modification of the invention wherein the bidentate ligand is a bidentate ligand of phosphorus, the ligand is preferably a ligand of the formula

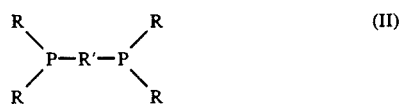 (II)

wherein R independently is an aromatic group preferably substituted on at least one carbon atom located ortho to the carbon atom connecting the group to the phosphorus with a lower alkoxy substituent. Such R groups include 2-methoxyphenyl, 2-ethoxyphenyl, 2,4-dimethoxyphenyl, 2,6-diethoxyphenyl and 2,4,6-trimethoxyphenyl. The group R' is a bridging group having 2 to 4 carbon atoms in the bridge. Preferred R' groups are polymethylene groups, i.e., groups of the formula $-(CH_2)_n-$ wherein n is an integer from 2 to 4 inclusive. Particularly preferred as the R' group is the trimethylene or $-CH_2-CH_2-CH_2-$ group. The preferred bidentate ligand of phosphorus is 1,3-bis[di(2-methoxyphenyl)phosphino]propane. Regardless of which bidentate ligand is employed, the ligand is provided in a quantity of from about 1 mol to about 1000 mols per mol of palladium with quantities of from about 2 mols to about 100 mols per mol of palladium being preferred.

It is useful on occasion to employ as a fourth component in the catalyst composition mixture an organic oxidizing agent in order to enhance the activity of the catalyst. Suitable organic oxidants include aliphatic nitrites such as butyl nitrite and hexyl nitrite, aromatic nitro compounds such as nitrobenzene and 2,4-dinitrotoluene and both 1,2-and 1,4-quinones. The quinones are the preferred class of organic oxidizing agents and benzoquinones, naphthoquinones and anthraquinones are satisfactory. In general, the 1,4-quinones give the best results when employed and particularly preferred is 1,4-benzoquinone. As stated, the presence of the organic oxidizing agent is not required but if present it is provided in a quantity of up to about 10,000 mols per mol of palladium. When the oxidizing agent is employed it is preferably present in a quantity of from about 10 mols to about 50 mols per mol of palladium.

The bicyclic carboxylic acid reactant of the invention is an unsaturated organic compound of up to 10 carbon atoms inclusive having two rings at least one of which is six-membered with the 1- and 4-carbon atoms connected by oxygen or methylene, the 5 and 6 carbon atoms connected by a double bond and having an oxycarbonyl substituent on at least one of the 2 and 3 carbon atoms. A preferred class of such bicyclic carboxylic acid compounds is represented by the formula

 (III)

wherein Y is oxo or methylene, Z is carboxy and Z' is alkyl or Z, with the proviso that when Z' is Z, the two carboxy groups may also be present as an anhydride moiety, i.e., a —CO—O—CO— group. In the above formula III when Y is methylene the bicyclic carboxylic acid compounds are illustrated by 5-norbornene-2-carboxylic acid, 5-norbornene-2,3-dicarboxylic acid, 5-norbornene-2,3-dicarboxylic acid anhydride, 3-methyl-5-norbornene-2-carboxylic acid. When Y is oxo in the above formula III, the bicyclic carboxylic acid compounds are illustrated by 1,4-endoxo-5-cyclohexene-2,3-dicarboxylic acid and 1,4-endoxo-5-cyclohexene-2,3-dicarboxylic acid anhydride.

In the modification of the process of the invention which employs a catalyst composition based on a bidentate nitrogen ligand, the polymer product is a linear alternating polymer of carbon monoxide and the unsaturated bicyclic carboxylic acid compound. Such polymers have a polymeric chain represented by the repeating formula

 (IV)

wherein G is a moiety of the bicyclic carboxylic acid compound polymerized through the ethylenic unsaturation thereof. Such polymers are produced by contacting the carbon monoxide and the unsaturated bicyclic carboxylic acid compound in a molar ratio of from about 10:1 to about 1:10, preferably a molar ratio from about 5:1 to about 1:5, under polymerization conditions in the presence of the catalyst composition. The linear alternating polymer of the above formula IV is obtained as a substantially sole polymer product.

In the modification of the process of the invention which employs a bidentate ligand of phosphorus, the presence of an ethylenically unsaturated hydrocarbon as an additional unsaturated reactant is required. Suitable ethylenically unsaturated hydrocarbons useful as the additional reactant have up to 10 carbon atoms and are illustrated by aliphatic hydrocarbons including ethylene and other α-olefins such as propylene, 1-butene, isobutylene, 1-hexene and 1-decene as well as by arylaliphatic hydrocarbons such as styrene. The preferred ethylenically unsaturated hydrocarbon is ethylene. In this modification, a mixture of three polymeric products is obtained. One of these products is the linear alternating polymer represented by the above formula IV. A second polymer present in the product mixture is a linear alternating polymer having a polymeric chain represented by the repeating formula

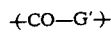

wherein G' is the moiety of the ethylenically unsaturated hydrocarbon polymerized through the ethylenic unsaturation. The third component of the polymeric product mixture is a block copolymer having as one segment type a linear alternating polymer of carbon monoxide and the unsaturated bicyclic carboxylic acid compound, i.e., a segment represented by formula IV, and as a second segment type a linear alternating copolymer of carbon monoxide and the ethylenically unsaturated hydrocarbon, i.e., a segment represented by formula V. In this modification the molar ratio of the carbon monoxide to total hydrocarbon to be polymerized is from about 10:1 to about 1:10 but preferably is from about 5:1 to about 1:5.

The end groups or "caps" of each of the above polymers will depend in part upon what materials are present during the polymerization and whether and how the polymer has been purified. The end groups have little apparent significance so far as the overall properties of the polymers are concerned so that the individual polymers are fairly represented by the above formulas for the polymeric chain or chains.

The polymerization in either modification is conducted by contacting the unsaturated reactant(s) and the catalyst composition under polymerization conditions in the presence of a reaction diluent. The preferred reaction diluent is a diluent in which the polymeric product is substantially insoluble. Such diluents include lower alkanols such as methanol and ethanol, lower alkanones such as acetone and methyl ethyl ketone and mixtures thereof. Methanol is a particularly preferred reaction diluent. Sufficient catalyst composition is employed in the reaction mixture to provide from about $1 \times 10^{-7}$ mol to about $1 \times 10^{-3}$ mol of palladium per mol of total unsaturated reactant. Amounts of palladium from about $1 \times 10^{-6}$ mol to about $1 \times 10^{-4}$ mol per mol of total unsaturated reactant are preferred. Typical polymerization conditions include a reaction temperature of from about 20° C. to about 150° C., preferably from about 30° C. to about 130° C., and a reaction pressure from about 2 bar to about 150 bar with pressures from about 35 bar to about 100 bar being preferred. Reactant/catalyst composition contact is maintained during polymerization by conventional methods such as stirring or shaking. Subsequent to reaction, the polymerization is terminated as by cooling the reaction mixture and releasing the pressure. The polymer product or product mixture is customarily obtained as an insoluble material in the diluent and is recovered by well known procedures such as filtration or decantation. The polymeric product is employed as such or can be purified as by contact with a solvent or complexing agent which is selective for catalyst residues. In the modification where a mixture of polymeric products is obtained, the mixture is employed as formed or can be separated, at least as between the linear alternating polymers and the block copolymer, by contact with a solvent such as hexafluoroisopropanol in which the linear alternating polymers but not the block copolymer are soluble.

The polymeric product or product mixture is a thermoplastic material processable by methods conventionally employed for thermoplastics, e.g., extrusion, injection molding or thermoforming, into wires and cables, films, sheets and shaped articles such as containers for food and drink. By virtue of the pendant functionalization of the polymeric material because of the carboxylic acid type substituents, the properties of the polymeric material are modified as by esterification through reaction with lower alcohols or by catalytic reduction of the carboxyl groups to give polymeric polyols having barrier properties. The carboxylic acid moieties also serve as the reactive site for crosslinking of polymers as by reaction with polyfunctional epoxides.

The invention is further illustrated by the following Illustrative Embodiments which should not be construed as limiting the invention.

ILLUSTRATIVE EMBODIMENT I

A copolymer of carbon monoxide and 5-norbornene-2,3-dicarboxylic acid anhydride was produced by charging to an autoclave of 250 ml capacity equipped with a mechanical stirrer a catalyst composition solution which comprised 50 ml of methanol, 0.1 mmol palladium acetate, 3 mmol p-toluenesulfonic acid, 3 mmol 2,2'-bipyridine and 20 mmol 1,4-benzoquinone. After 10 g of 5-norbornene-2,3-dicarboxylic acid anhydride was added to the autoclave, the air present was removed by evacuation and carbon monoxide was introduced to give a pressure of 40 bar. The contents of the autoclave were warmed to 60° C. and maintained at that temperature for 5 hours. Polymerization was then terminated by cooling the autoclave and contents to room temperature and releasing the pressure. The reaction product, about 12 g, was determined with the aid of $^{13}$C-NMR analysis to be a linear alternating copolymer of carbon monoxide and 5-norbornene-2,3-dicarboxylic acid anhydride.

ILLUSTRATIVE EMBODIMENT II

A polymer of carbon monoxide and 3-methyl-5-norbornene-2-carboxylic acid was produced by a procedure substantially similar to that of Illustrative Embodiment I except that 10 g of 3-methyl-5-norbornene-2-carboxylic acid was used instead of the acid anhydride, the carbon monoxide pressure was 30 bar instead of 40 bar, the reaction temperature was 65° C. instead of 60° C. and the reaction time was 1 hour instead of 5 hours. The polymer product, about 7 g, was shown by $^{13}$C-NMR analysis to be a linear alternating polymer of carbon monoxide and 3-methyl-5-norbornene-2-carboxylic acid.

ILLUSTRATIVE EMBODIMENT III

A copolymer of carbon monoxide and 5-norbornene-2,3-dicarboxylic acid was produced by a procedure substantially similar to that of Illustrative Embodiment I except that 10 g of 5-norbornene-2,3-dicarboxylic acid was used instead of the dicarboxylic acid anhydride and the reaction time was 1 hour instead of 5 hours. The reaction product, about 6 g, was shown by $^{13}$C-NMR analysis to be a linear alternating polymer of carbon monoxide and 5-norbornene-2,3-dicarboxylic acid.

ILLUSTRATIVE EMBODIMENT IV

A polymer mixture containing a copolymer of carbon monoxide and 5-norbornene-2,3-diarboxylic acid anhydride was produced by charging to an autoclave of 250 ml capacity equipped with a mechanical stirrer a catalyst composition solution comprising 50 mol of methanol, 0.1 mmol palladium acetate, 0.2 mmol trifluoroacetic acid and 0.15 mmol 1,3-bis(diphenylphosphino)propane. After 5 g of 5-norbornene-2,3-dicarboxylic acid anhydride was added to the autoclave the air present was removed by evacuation and ethylene was introduced until a pressure of 20 bar was reached followed by carbon monoxide until a pressure of 50 bar was reached. The contents of the autoclave were warmed to 65° C. and maintained at that temperature for 5 hours. The polymerization was then terminated by cooling the reactor and contents to room temperature and releasing the pressure. The polymeric product was removed from the product mixture by filtration, washed with methanol and dried in vacuo at room temperature. The polymer yield was 19.5 g.

A sample of this polymeric material was dissolved in 30% wt of a mixture of 90% volume hexafluoroisopropanol and 10% deuterobenzene for analysis. The resulting solution separated into two layers, each of which was subjected to $^{13}$C-NMR analysis. The upper layer was shown to be a physical mixture of a linear alternating polymer of carbon monoxide and ethylene and a linear alternating polymer of carbon monoxide and 5-norbornene-2,3-dicarboxylic acid anhydride. The mixture contained 132 units derived from ethylene per 5 units derived from the norbornene compound. The bottom layer was shown to be a block copolymer in which one segment was a linear alternating polymer of carbon monoxide and ethylene and the other segment was a linear alternating copolymer of carbon monoxide and 5-norbornene-2,3-dicarboxylic acid anhydride. In the block copolymer there were 86 units derived from ethylene per 14 units derived from the acid anhydride. In the total of these three polymers, there were 218 units derived from ethylene per 19 units derived from 5-norbornene-2,3-dicarboxylic acid anhydride.

ILLUSTRATIVE EMBODIMENT V

The procedure of Illustrative Embodiment IV was substantially repeated except that 0.3 mmol copper p-toluenesulfonate was employed instead of trifluoroacetic acid and the reaction temperature was 70° C. instead of 65° C. A total of 26 g of polymeric material was obtained. The $^{13}$C-NMR analysis indicated that the polymeric product was a mixture of the same three polymers.

ILLUSTRATIVE EMBODIMENT VI

The procedure of Illustrative Embodiment IV was substantially repeated except that 10 g of 5-norbornene-2,3-dicarboxylic acid anhydride was used instead of 5 g and the reaction temperature was 75° C. instead of 65° C. The polymeric material obtained was 21 g. The $^{13}$C-NMR analysis indicated that the polymeric material was made up of the three types of polymers as described in Illustrative Embodiment IV but that units derived from ethylene and units derived from 5-norbornene-2,3-dicarboxylic acid anhydride were present in a 1:1 ratio.

ILLUSTRATIVE EMBODIMENT VII

A polymeric mixture containing a copolymer of carbon monoxide and 5-norbornene-2,3-dicarboxylic acid was produced by a procedure substantially similar to that of Illustrative Embodiment I except that 5 g of 5-norbornene-2,3-dicarboxylic acid were used instead of the acid anhydride, the ethylene was introduced until a pressure of 15 bar (instead of 20 bar) was reached and carbon monoxide was added until a pressure of 45 bar was reached (instead of 50 bar), the reaction temperature was 80° C. instead of 65° C. and the reaction time was 2 hours instead of 5 hours. The polymeric material obtained was 17 g. By $^{13}$C-NMR analysis it was determined that the polymeric material contained a linear alternating copolymer of carbon monoxide and ethylene, a linear alternating polymer of carbon monoxide and 5-norbornene-2,3-dicarboxylic acid and a block copolymer in which one segment was a linear alternating CO/ethylene block and the other segment was a carbon monoxide/5-norbornene-2,3-dicarboxylic acid block.

ILLUSTRATIVE EMBODIMENT VIII

A polymeric mixture containing a copolymer of carbon monoxide and 1,4-endoxo-5-cyclohexene-2,3-dicarboxylic acid was produced by a method substantially similar to that of Illustrative Embodiment IV except that 5 g of 1,4-endoxo-5-cyclohexene-2,3-dicarboxylic acid anhydride was employed instead of the 5-norbornene-2,3-dicarboxylic acid anhydride and the reaction temperature was 75° C. instead of 65° C. The yield of polymeric material was 5.7 g. The $^{13}$C-NMR analysis of the polymeric product indicated a mixture of (a) a linear alternating polymer of carbon monoxide and ethylene, (b) a linear alternating polymer of carbon monoxide and 1,4-endoxo-5-cyclohexene-2,3-dicarboxylic anhydride and (c) a block copolymer wherein one segment is a linear alternating CO/ethylene block and the other segment is a carbon monoxide/1,4-endoxo-5-cyclohexene-2,3-dicarboxylic acid anhydride block. In the mixture the analysis indicated that there were 139 units derived from ethylene per 3 units derived from 1,4-endoxo-5-cyclohexene-2,3-dicarboxylic acid anhydride.

What is claimed is:

1. A process of preparing a linear alternating polymer of carbon monoxide and an unsaturated bicyclic carboxylic acid compound which comprises contacting a mixture of carbon monoxide and the carboxylic acid compound under polymerization conditions in the presence of a catalyst composition formed from a palladium compound, the anion of a non-hydrohalogenic acid having a pKa below about 4 and a bidentate ligand of nitrogen.

2. The process of claim 1 wherein the unsaturated carboxylic acid compound is represented by the formula

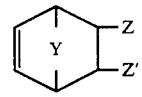

wherein Y is oxo or methylene, Z is carboxy and Z' is alkyl or Z, with the proviso that when Z' is Z, the two carboxy acid groups are present as an anhydride moiety.

3. The process of claim 2 wherein the palladium compound is palladium acetate and the anion is the anion of trifluoroacetic acid or p-toluenesulfonic acid.

4. The process of claim 3 wherein the bidentate ligand is a bidentate ligand of nitrogen of the formula

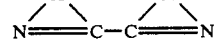

wherein X independently is a bridging group of from 2 to 4 atoms in the bridge, at least two of which are carbon atoms.

5. The process of claim 4 wherein the ligand is 2,2'-pyridine.

6. The process of claim 4 wherein the ligand is 1,10-phenanthroline.

7. The process of claim 5 wherein Z' is Z.

8. The process of claim 5 wherein the carboxylic acid compound is 5-norbornene-2,3-dicarboxylic acid anhydride.

9. The process of claim 5 wherein the carboxylic acid compound is 5-norbornene-2,3-dicarboxylic acid.

10. A process of preparing a linear alternating polymer of carbon monoxide, an ethylenically unsaturated hydrocarbon, and an unsaturated bicyclic carboxylic acid compound which comprises contacting a mixture of carbon monoxide and the carboxylic acid compound under polymerization conditions, in the presence of methanol or ethanol, and in the presence of a catalyst composition formed from a palladium compound, the anion of a non-hydrohalogenic acid having a pKa below about 4 and a bidentate ligand of phosphorus.

11. The process of claim 10 wherein the unsaturated carboxylic acid compound is represented by the formula

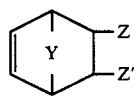

wherein Y is oxo or methylene, Z is carboxy and Z' is alkyl or Z, with the proviso that when Z' is Z, the two carboxy acid groups are present as an anhydride moiety.

12. The process of claim 11 wherein any ethylenically unsaturated hydrocarbon present is ethylene.

13. The process of claim 12 wherein the palladium compound is palladium acetate and the anion is the anion of trifluoroacetic acid or p-toluenesulfonic acid.

14. The process of claim 10 wherein the bidentate ligand is a ligand of phosphorus of the formula

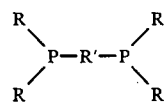

wherein R independently is aromatic substituted in at least one position ortho to the carbon connecting the group to the phosphorus with a lower alkoxy substituent and R' is a bridging group of from 2 to 4 carbon atoms in the bridge.

15. The process of claim 14 wherein the ligand is 1,3-bis[di(2-methoxyphenyl)phosphino]propane.

16. The process of claim 15 wherein Z' is Z.

17. The process of claim 16 wherein the carboxylic acid compound is 5-norbornene-2,3-dicarboxylic acid anhydride.

18. The process of claim 16 wherein the carboxylic acid compound is 5-norbornene-2,3-dicarboxylic acid.

* * * * *